（12） United States Patent
Nomura et al.

(10) Patent No.: US 9,093,938 B2
(45) Date of Patent: Jul. 28, 2015

(54) MOTOR DRIVER CIRCUIT AND VACUUM PUMP HAVING THE MOTOR DRIVER CIRCUIT (75) Inventors: Shinichi Nomura, Chiba (JP); Ulrich Schroder, Saint Marcel (FR)

(73) Assignees: Edwards Japan Limited, Chiba (JP); Societe de Mecanique Magnetique, Saint Marcel (FR)

( * ) Notice: Subject to any disclaimer, the term of this patent is extended or adjusted under 35 U.S.C. 154(b) by 530 days.

(21) Appl. No.: 12/737,089

(22) PCT Filed: Jun. 1, 2009

(86) PCT No.: PCT/JP2009/002442
§ 371 (c)(1),
(2), (4) Date: Feb. 7, 2011

(87) PCT Pub. No.: WO2010/016176
PCT Pub. Date: Feb. 11, 2010

(65) Prior Publication Data
US 2011/0121767 A1    May 26, 2011

(51) Int. Cl.
*H02P 3/14*    (2006.01)
*H02P 3/18*    (2006.01)
(Continued)

(52) U.S. Cl.
CPC . *H02P 3/18* (2013.01); *F04B 49/06* (2013.01); *F04D 19/042* (2013.01); *F04D 25/0606* (2013.01); *F04D 27/00* (2013.01); *H02P 27/08* (2013.01)

(58) Field of Classification Search
USPC ............. 318/376, 514, 56, 57, 60, 63, 86, 88, 318/400.09, 741, 757, 258, 261, 269, 273, 318/362
See application file for complete search history.

(56) References Cited

U.S. PATENT DOCUMENTS 4,667,776 A  *  5/1987  Nomura ........................ 187/289
5,172,006 A     12/1992 Suzuki et al.
(Continued)

FOREIGN PATENT DOCUMENTS

JP    61240869    10/1976
JP    6225458     8/1994
(Continued)

OTHER PUBLICATIONS

Translation of Notification of Reasons for Rejection received in corresponding JP Application No. 2010-523724, mailed Jul. 16, 2013, 3 pgs.
(Continued)

*Primary Examiner* — Kawing Chan
*Assistant Examiner* — Jorge L Carrasquillo
(74) *Attorney, Agent, or Firm* — Shumaker & Sieffert, P.A.

(57) ABSTRACT

Provided are a compact and low-cost motor driver circuit capable of achieving an appropriate brake time and restraining heat generated by a regenerative resistance within a specific temperature range without employing a regenerative resistance having a greater capacity, a heat sink, or a FAN generating a larger volume of air, and a vacuum pump having the motor driver circuit. Regenerative current is controlled so that a speed characteristic gradually approaches inclination "a" from inclination "b" depending on the motor speed in the initial stage of regeneration. In addition, a limit is set not to pass further current when the regenerative current reaches a maximum brake current value $I_{set\_brake\_max}$. As stated above, when the motor is braked, control is performed so that the initial brake current value at the maximum rated speed is set low and the brake current is increased as the rotational speed decelerates.

5 Claims, 10 Drawing Sheets (51) Int. Cl.
    *F04B 49/06*     (2006.01)
    *F04D 19/04*     (2006.01)
    *F04D 25/06*     (2006.01)
    *F04D 27/00*     (2006.01)
    *H02P 27/08*     (2006.01)

(56) References Cited

U.S. PATENT DOCUMENTS

| | | |
|---|---|---|
| 6,326,762 B1 | 12/2001 | Jiang et al. |
| 2002/0145401 A1 | 10/2002 | Sato et al. |
| 2003/0057003 A1* | 3/2003 | Kawada et al. ............... 180/65.1 |
| 2006/0192516 A1* | 8/2006 | Maeda ............................ 318/650 |
| 2007/0216328 A1* | 9/2007 | Iura et al. ....................... 318/362 |
| 2007/0284196 A1* | 12/2007 | Sakai et al. ..................... 187/305 |

FOREIGN PATENT DOCUMENTS

| | | | |
|---|---|---|---|
| JP | 9182474 | | 7/1997 |
| JP | 11 18464 | | 1/1999 |
| JP | 11018464 A | * | 1/1999 |
| JP | 11215610 A | | 8/1999 |
| JP | 20006878 A | | 1/2000 |
| JP | 2004154961 A | * | 6/2004 |
| JP | 2004173444 A | | 6/2004 |
| JP | 2005 94852 | | 4/2005 |
| JP | 2005094852 A | * | 4/2005 |

OTHER PUBLICATIONS

Extended European Search Report mailed Oct. 24, 2013 in corresponding EP Application No. 09804663.4, 11 pgs.

Translation of the Notification of Reasons for Rejection from counterpart Japanese application No. 2010-523724, mailed Apr. 1, 2014, 3 pp.

English Translation of Opinion Submission Notification from counterpart Korean Patent Application No. 10-2010-7027521, dated Dec. 18, 2014, 8 pp.

Examination Report from counterpart European Application No. 09804663.4-1809, dated Dec. 17, 2014, 6 pp.

* cited by examiner

MOTOR DRIVER CIRCUIT AND VACUUM PUMP HAVING THE MOTOR DRIVER CIRCUIT

CROSS-REFERENCE TO RELATED APPLICATIONS

This application is a U.S. national stage application under 35 U.S.C. §371 of International Application No. PCT/JP2009/002442 filed Jun. 1, 2008, which claims priority to Japanese Patent Application No. 2008-202344, filed Aug. 5, 2008.

TECHNICAL FIELD

The present invention relates to a motor driver circuit and a vacuum pump having the motor driver circuit, and particularly relates to a compact and low-cost motor driver circuit capable of achieving an appropriate brake time and restraining heat generated by a regenerative resistance within a specific temperature range without employing a regenerative resistance having a greater capacity, a heat sink, or a FAN generating a larger volume of air, and a vacuum pump having the motor driver circuit.

BACKGROUND

With the recent years' development of electronics, there is a rapidly increasing demand for semiconductors for forming memories, integrated circuits, etc.

Such semiconductors are manufactured, for example, by doping a semiconductor substrate of a very high purity with impurities to impart electrical properties thereto, or by stacking together semiconductor substrates with minute circuit patterns formed thereon.

The operation of manufacturing such semiconductors must be conducted in a high vacuum chamber in order to avoid the influences of dust, etc. in the air. This chamber is generally evacuated by a vacuum pump. In particular, a turbo-molecular pump, which is a kind of vacuum pump, is widely used since it entails little residual gas and is easy of maintenance.

A semiconductor manufacturing process includes a number of steps in which various process gases are caused to act on a semiconductor substrate, and the turbo-molecular pump is used not only to evacuate the chamber but also to discharge these process gases from the chamber.

Further, in an apparatus like an electron microscope, a turbo-molecular pump is used to create a high vacuum state in the chamber of the apparatus in order to prevent refraction, etc. of an electron beam due to the presence of dust or the like.

Such a turbo-molecular pump is composed of a turbo-molecular pump main body for sucking and discharging gas from the chamber of a semiconductor manufacturing apparatus, an electron microscope, or the like, and a control device for controlling the turbo-molecular pump main body.

Figure 8:
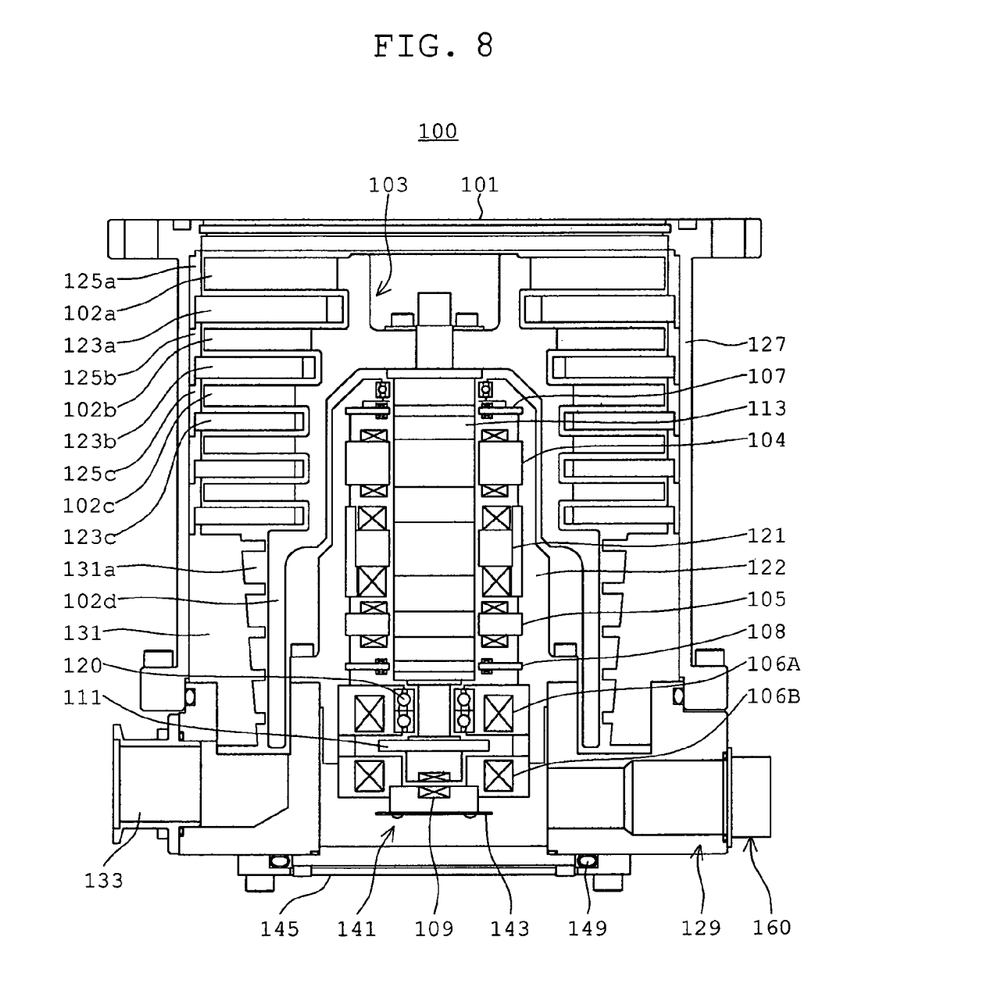
FIG. 8 is a longitudinal sectional view of a turbo molecular pump main body.

FIG. 8 is a longitudinal sectional view of a turbo-molecular pump main body.

In FIG. 8, a turbo-molecular pump main body 100 includes an outer cylinder 127, on top of which there is formed an intake hole 101. Provided inside the outer cylinder 127 is a rotor 103 having in its periphery a plurality of rotary blades 102a, 102b, 102c, . . . serving as turbine blades for sucking and discharging gas and formed radially in a number of stages.

At the center of the rotor 103, there is mounted a rotor shaft 113, which is supported in a levitating state and controlled in position, for example, by a so-called 5-axis control magnetic bearing.

Upper radial electromagnets 104 consist of four electromagnets arranged in pairs in X- and Y-axis directions, perpendicular to each other, and opposed to each other with the rotor shaft 113 therebetween. It is to be assumed that the X- and Y-axes are in a plane perpendicular to the axis of the rotor shaft 113 when the rotor shaft 113 is at a control target position of the magnetic bearing. Further, there is provided an upper radial sensor 107 consisting of four coils which are opposed to each other with the rotor 103 therebetween and arranged in close proximity to and in correspondence with the four upper radial electromagnets 104. The upper radial sensor 107 detects radial position of the rotor 103, transmitting a detection signal to a control device.

The rotor shaft 113 is formed of a high-magnetic-permeability material (e.g., iron) and is adapted to be attracted by the magnetic force of the upper radial electromagnets 104.

Further, lower radial electromagnets 105 and a lower radial sensor 108 are arranged in the same way as the upper radial electromagnets 104 and the upper radial sensor 107. The lower radial sensor 108 detects the radial position of the lower portion of the rotor shaft 113 and transmits a detection signal to the control device. The radial positions of the upper and lower portions of the rotor shaft 113 are adjusted by the magnetic bearing feedback control means in the control device.

Further, axial electromagnets 106A and 106B are arranged respectively on the upper and lower sides of a metal disc 111 provided in the lower portion of the rotor shaft 113. The metal disc 111 is formed of a high-magnetic-permeability material, such as iron. To detect axial position of the rotor 103, there is provided an axial sensor 109, which transmits an axial position signal to the control device.

The axial electromagnet 106A magnetically attracts the metal disc 111 upwardly, and the axial electromagnet 106B magnetically attracts the metal disc 111 downwardly.

In this way, in the control device, the magnetic force the axial electromagnets 106A and 106B exert on the metal disc 111 is appropriately controlled by the magnetic bearing feedback control means, magnetically levitating the rotor shaft 113 in the axial direction and retaining it in the space in a non-contact state.

A motor 121 is equipped with a plurality of magnetic poles consisting of permanent magnets arranged circumferentially on the rotor side so as to surround the rotor shaft 113. A torque for rotating the rotor shaft 113 is imparted to these permanent magnets from the electromagnets on the stator side of the motor 121, thereby rotating the rotor 103.

Further, an RPM sensor and a motor temperature sensor (not shown) are mounted to the motor 121, and the rotation of the rotor shaft 113 is controlled in the control device in response to detection signals from the RPM sensor and the motor temperature sensor.

A plurality of stationary blades 123a, 123b, 123c, . . . are arranged so as to be spaced apart from the rotary blades 102a, 102b, 102c, . . . by small gaps. In order to downwardly transfer the molecules of exhaust gas through collision, the rotary blades 102a, 102b, 102c, . . . are inclined by a predetermined angle with respect to a plane perpendicular to the axis of the rotor shaft 113.

Similarly, the stationary blades 123 are also inclined by a predetermined angle with respect to a plane perpendicular to the axis of the rotor shaft 113, and extend toward the inner side of the outer cylinder 127 to be arranged alternately with the rotary blades 102.

The stationary blades 123 are supported at one end by being inserted into gaps between a plurality of stationary blade spacers 125a, 125b, 125c, . . . stacked together in stages.

The stationary blade spacers 125 are ring-shaped members, which are formed of a metal, such as aluminum, iron, stainless steel, or copper, or an alloy containing such metal as a component.

In the outer periphery of the stationary blade spacers 125, the outer cylinder 127 is secured in position with a small gap therebetween. At the bottom of the outer cylinder 127, there is arranged a base portion 129, and a threaded spacer 131 is arranged between the lowermost one of the stationary blade spacers 125 and the base portion 129.

In the portion of the base portion 129 below the threaded spacer 131, there is formed a discharge outlet 133. Connected to the discharge outlet 133 is a dry-sealed vacuum pump passage (not shown), and the discharge outlet 133 is connected to a dry-sealed vacuum pump (not shown) through this dry-sealed vacuum pump passage.

The threaded spacer 131 is a cylindrical member formed of a metal, such as aluminum, copper, stainless steel, or iron, or an alloy containing such metal as a component, and has a plurality of spiral thread grooves 131a in its inner peripheral surface.

The spiral direction of the thread grooves 131a is determined such that when the molecules of the exhaust gas move in the rotating direction of the rotor 103, these molecules are transferred toward the discharge outlet 133.

Connected to the lowermost one of the rotary blades 102a, 102b, 102c, . . . of the rotor 103 is a cylindrical portion 102d, which extends vertically downwards. The outer peripheral surface of this cylindrical portion 102d sticks out toward the inner peripheral surface of the threaded spacer 131, and is in close proximity to the inner peripheral surface of the threaded spacer 131 with a predetermined gap therebetween.

The base portion 129 is a disc-like member constituting the base of the turbo-molecular pump main body 100, and is generally formed of a metal, such as iron, aluminum, or stainless steel. The base portion 129 physically retains the turbo-molecular pump main body 100, and also functions as a heat conduction passage. Thus, the base portion 129 is preferably formed of a metal that is rigid and of high heat conductivity, such as iron, aluminum, or copper.

Further, connected to the base portion 129 is a connector 160, to which a cable is connected to electrically connect the turbo-molecular pump main body 100 and the control device.

In the above-described construction, when the rotary blades 102 are driven and rotated by the motor 121 together with the rotor shaft 113, an exhaust gas from a chamber (not shown) is sucked in through the intake hole 101, due to the action of the rotary blades 102 and the stationary blades 123.

The exhaust gas sucked in through the intake hole 101 passes between the rotary blades 102 and the stationary blades 123, and is transferred to the base portion 129. The exhaust gas transferred to the base portion 129 is sent to the discharge outlet 133 while being guided by the thread grooves 131a of the threaded spacer 131.

Figure 9:
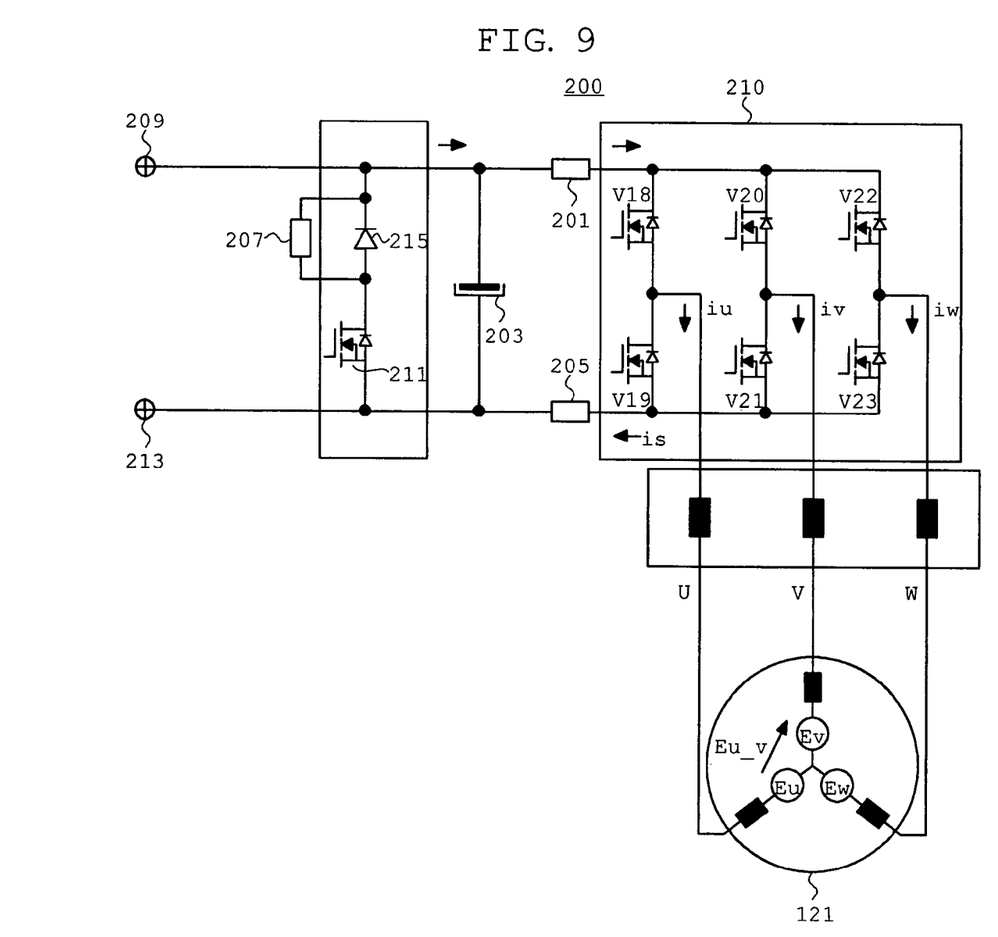
FIG. 9 is a block diagram of a motor driver circuit.

FIG. 9 is a block diagram of a motor driver circuit for driving the motor 121. A motor driver circuit 200 includes a three-phase bridge circuit 210 formed of six FET elements V18, V19, V20, V21, V22, and V23 in order to pass three phase current through a U-phase winding, a V-phase winding, and a W-phase winding of the stator of the motor 121 in accordance with the flow chart of FIG. 10. For example, in section 1, V18 and V21 are turned ON to pass current in the direction from the U phase to the V phase. Further, in section 2, V18 and V23 are turned ON to pass current in the direction from the U phase to the W phase. Also in the sections following section 3, the FET elements are sequentially switched in accordance with the flow chart to generate a rotating magnetic field.

One end of the three-phase bridge circuit 210 is connected to one end of a capacitor 203 through a short-circuit protection element 201. The other end of the three-phase bridge circuit 210 is connected to the other end of the capacitor 203 through a motor current detecting circuit 205. One end of the capacitor 203 is further connected to one end of a regenerative resistance 207 and a positive pole 209 of a power source. The other end of the capacitor 203 is connected to the other end of the regenerative resistance 207 through a regeneration resistance drive FET 211 and is connected to a negative pole 213 of the power source. Both ends of the regenerative resistance 207 are connected to a diode 215 in parallel with this regenerative resistance 207.

Figure 10:
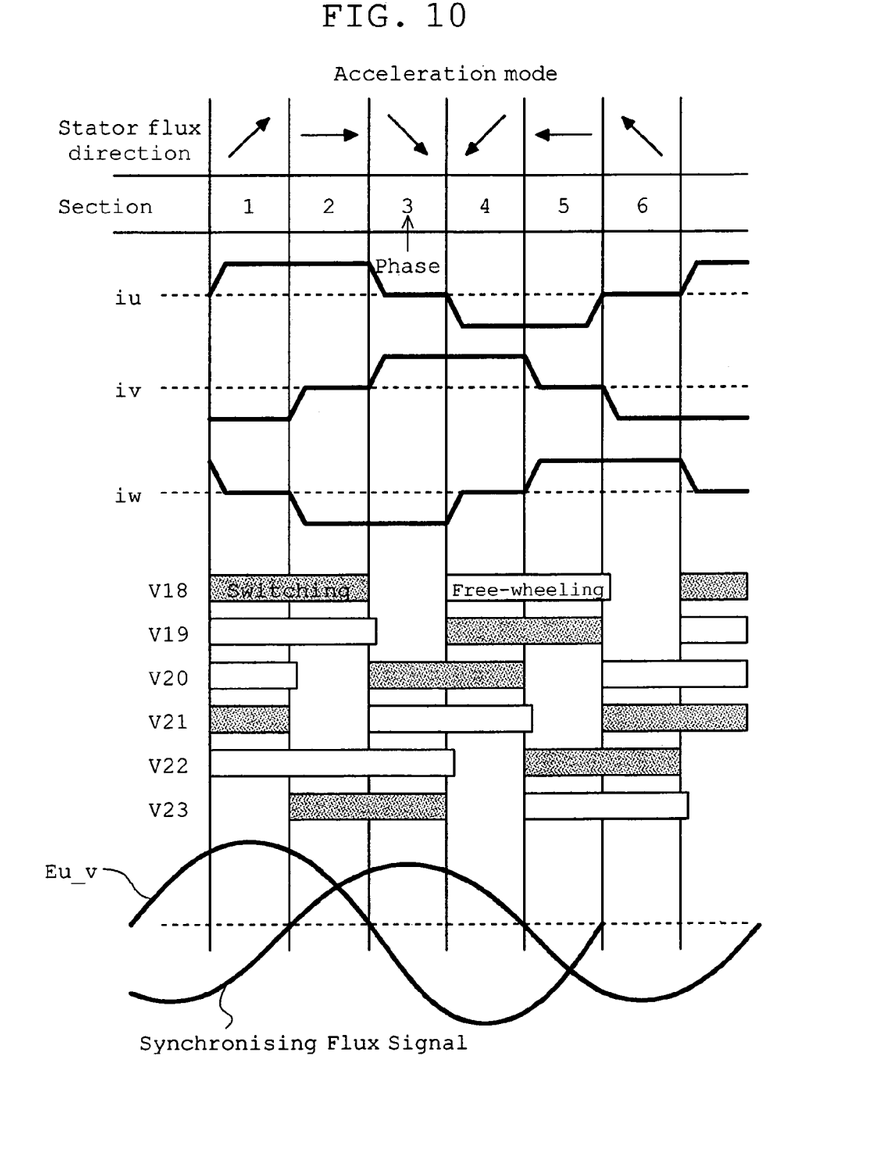
FIG. 10 is a flow chart to drive the motor.

When accelerating the pump, a driver control CPU (not shown) performs PWM control on each FET of the three-phase bridge circuit 210 so that the value of current which is detected by the motor current detecting circuit 205 and is supplied to the motor 121 becomes a predetermined constant current value, while letting the current reversely flow through each phase in accordance with the timing of FIG. 10 by using a rotational speed sensor (not shown) so that the motor rotates at a predetermined rotation number. Further, when the motor is braked, the driver control CPU performs PWM control on each FET of the three-phase bridge circuit 210 so that the current has a predetermined current value, and makes the regenerative resistance 207 consume electric power regenerated from the motor 121 as heat energy with the current flowing through each phase in the direction reverse to that when accelerating the motor, thereby the regeneration resistance drive FET 211 being turned ON/OFF.

In order to consume more energy, the regenerative resistance 207 is a high-capacity (large-scaled) type, or is cooled by an air-cooling FAN mounted on a heat sink.

In order to let the regenerative resistance consume energy within a safe range, in a disclosed conventional technique, regeneration energy is calculated and whether or not to perform regenerative braking can be automatically selected with respect to each of a plurality of motors to prevent the regeneration energy from exceeding a predetermined value (Patent document 1). [Patent Document 1] Japanese Patent Laid-Open. Pub. No. 2006-194094

SUMMARY

However, the object of Patent document 1 is to let the regenerative resistance consume energy within a safe range by controlling regenerative braking of a plurality of motors, and is not to restrain heat generated by the regenerative resistance in each motor or to shorten brake time.

In each single motor, when generated regeneration energy is used to continuously supply current to the regenerative resistance 207 in order to shorten the brake time, heat generated by the regenerative resistance 207 becomes greater and the temperature thereof rises. Accordingly, it is necessary to use the regenerative resistance 207 having a large heat capacity, or to provide a heat sink to cool the regenerative resistance 207 by using a FAN generating a large volume of air. However, there is a problem that employment of these components increases cost and the dimension of a controller.

On the other hand, heat generated by the regenerative resistance 207 can be restrained by reducing current supplied to the regenerative resistance 207, but this causes a performance problem that brake time increases.

The present invention has been made in view of these conventional problems, and the object thereof is to provide a compact and low-cost motor driver circuit capable of achieving an appropriate brake time and restraining heat generated by a regenerative resistance within a specific temperature range without employing a regenerative resistance having a greater capacity, a heat sink, or a FAN generating a larger volume of air, and a vacuum pump having the motor driver circuit.

Accordingly, the motor driver circuit of the present invention may be characterized by including: a motor; a motor drive circuit configured to drive the motor; a motor speed detector configured to detect motor speed of the motor; a current detector configured to detect current flowing through the motor drive circuit; a motor driving current set value calculating unit configured to calculate a driving current set value of the motor depending on the motor speed detected by the motor speed detector when the motor is braked; and a driving current adjuster configured to adjust driving current so that the current detected by the current detector becomes the driving current set value calculated by the motor driving current set value calculating unit; in which the motor drive circuit drives the motor based on the driving current adjusted by the driving current adjuster.

By calculating the driving current set value for the motor depending on the motor speed when the motor is braked, consumption of regeneration energy can be reduced when the motor rotates at high speed and can be increased as the rotational speed decelerates.

In addition, the motor driver circuit of the present invention may include: a regenerative resistance configured to let regenerated current flowing from the motor drive circuit pass therethrough when the motor is braked, the regenerative resistance being arranged in parallel with a power source; a control element configured to control whether or not to pass current, the control element being connected in series with the regenerative resistance; a voltage detector configured to detect voltage of the motor drive circuit; and a control element driving unit configured to drive the control element ON/OFF so that the voltage detected by the voltage detector becomes a set voltage value or smaller.

Further, the motor driver circuit of the present invention may be characterized in that the driving current set value calculated by the motor driving current set value calculating unit is set small as an initial current value when the motor initially operates at a maximum rated speed, and is set larger as the motor speed decelerates.

In this way, the energy of the regenerative resistance is adjusted depending on the motor speed. Therefore, the motor speed can be decelerated in a short time within a maximum range of the allowable temperature for the regenerative resistance. Accordingly, it is possible to achieve an appropriate brake time and restrain heat generated by a regenerative resistance within a specific temperature range without employing a regenerative resistance having a greater capacity, a heat sink, or a FAN generating a larger volume of air.

Furthermore, the motor driver circuit of the present invention may be characterized in that a limit is set so that the driving current set value does not become a predetermined value or greater.

Still further, the motor driver circuit of the present invention may include: a motor; a motor drive circuit configured to drive the motor; a regenerative resistance configured to let regenerated current flowing from the motor drive circuit pass therethrough when the motor is braked, the regenerative resistance being arranged in parallel with a power source; a control element configured to control whether or not to pass current, the control element being connected in series with the regenerative resistance; a temperature detector configured to detect temperature of the regenerative resistance; a driving current command value calculating unit configured to calculate a driving current command value of the motor so that the temperature detected by the temperature detector becomes a predetermined value or smaller; a voltage detector configured to detect voltage of the motor drive circuit; and a control element driving unit configured to drive the control element ON/OFF so that the voltage detected by the voltage detector becomes a set voltage value or smaller.

Since the temperature of the regenerative resistance is directly detected to restrain heat generated by the regenerative resistance within a specific temperature range, the motor speed can be decelerated in a short time within a maximum range of the allowable temperature for the regenerative resistance.

Further, the motor driver circuit of the present invention may include: a motor; a motor drive circuit configured to drive the motor; a regenerative resistance configured to let regenerated current flowing from the motor drive circuit pass therethrough when the motor is braked, the regenerative resistance being arranged in parallel with a power source; a control element configured to control whether or not to pass current, the control element being connected in series with the regenerative resistance; a motor speed detector configured to detect motor speed of the motor; a current detector configured to detect current flowing through the motor drive circuit; a table configured to determine a relationship between the motor speed and a duty cycle of an ON/OFF signal for driving the control element; a duty cycle calculating unit configured to calculate, based on the table, the duty cycle of the ON/OFF signal for driving the control element depending on the motor speed detected by the motor speed detector when the motor is braked; and a control element controller configured to control ON/OFF of the control element based on the duty cycle calculated by the duty cycle calculating unit.

Since the duty cycle of the ON/OFF signal for driving the control element can be calculated depending on the motor speed based on the table, control can be easily performed.

Further, the motor driver circuit of the present invention may include: a motor; a motor drive circuit configured to drive the motor; a regenerative resistance configured to let regenerated current flowing from the motor drive circuit pass therethrough when the motor is braked, the regenerative resistance being arranged in parallel with a power source; a control element configured to control whether or not to pass current, the control element being connected in series with the regenerative resistance; a temperature detector configured to detect temperature of the regenerative resistance; and a control element ON/OFF controller configured to control ON/OFF of the control element so that the temperature detected by the temperature detector becomes a predetermined value or smaller.

Further, the motor driver circuit of the present invention may be characterized in that the duty cycle of the ON/OFF signal controlled by the control element ON/OFF controller is set so that an energization interval becomes short when the temperature detected by the temperature detector is high, and so that energization time becomes long when the temperature is low.

Further, the motor driver circuit of the present invention may include: a voltage detector configured to detect voltage of the motor drive circuit; and a driving current adjuster configured to adjust driving current so that the voltage detected by the voltage detector becomes a set voltage value or smaller, in which the motor drive circuit drives the motor based on the driving current adjusted by the driving current adjuster.

Further, the vacuum pump of the present invention may be characterized by including a motor driver circuit described herein.

As explained above, in the present invention, the driving current set value for the motor is calculated depending on the motor speed when the motor is braked, and thus consumption of regeneration energy can be reduced when the motor rotates at high speed and can be increased as the rotational speed decelerates.

DETAILED DESCRIPTION

Figure 1:
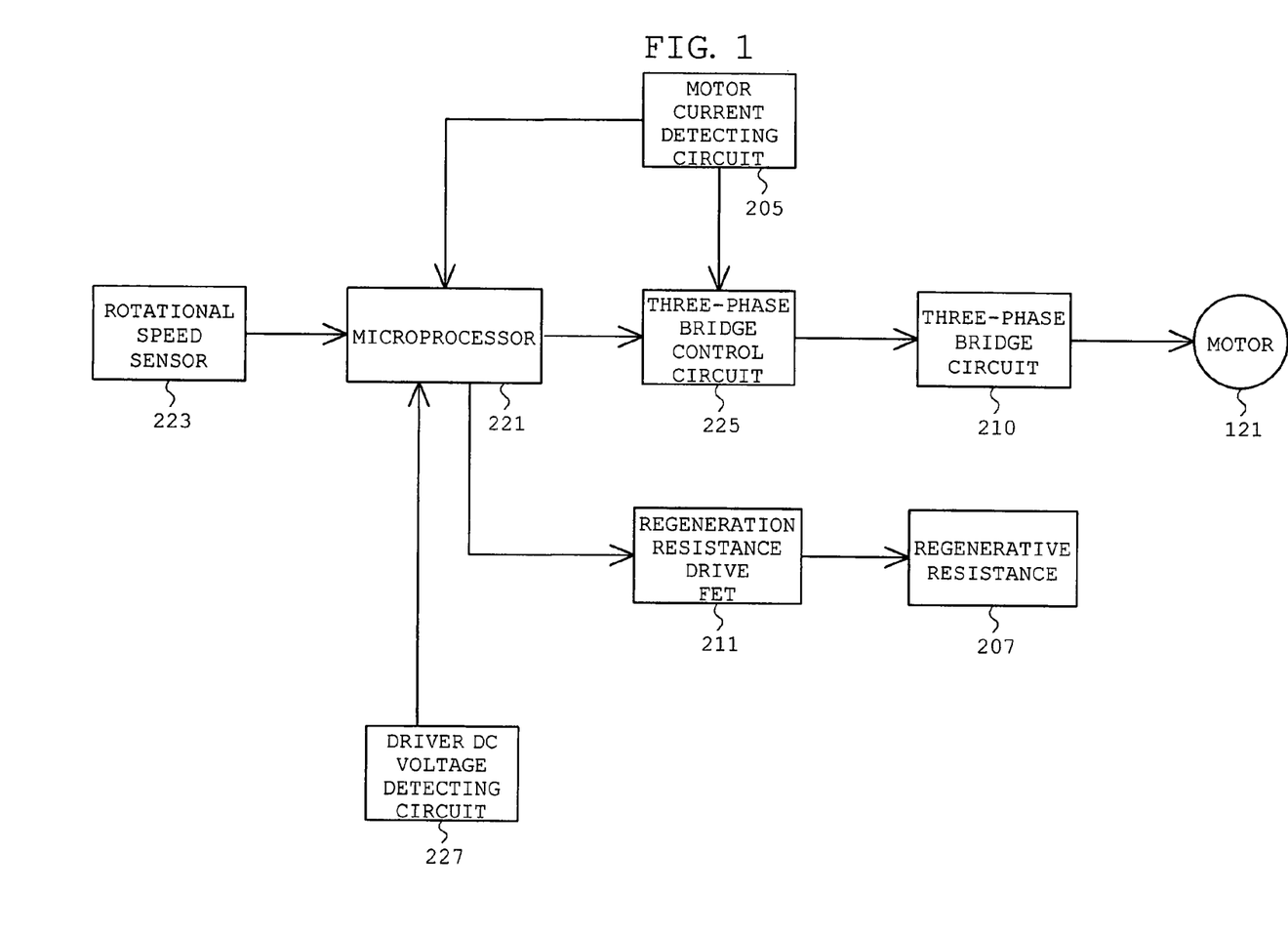
FIG. 1 is a block diagram of a first embodiment of the present invention.

Hereinafter, embodiments of the present invention will be explained. FIG. 1 shows a block diagram of a first embodiment of the present invention. Note that the same components as those in FIG. 9 are given the same symbols, and the explanation thereof will be omitted.

In FIG. 1, motor current detected by the motor current detecting circuit 205 is inputted into a microprocessor 221 and a three-phase bridge control circuit 225. Further, motor speed detected by a rotational speed sensor 223 is inputted into the microprocessor 221. The microprocessor 221 performs a predetermined calculation based on the inputted motor speed to obtain a current command value. The three-phase bridge control circuit 225 performs PID compensation calculation etc. so that the motor current detected by the motor current detecting circuit 205 becomes this current command value, and PWM control is performed on each FET of the three-phase bridge circuit 210 based on this compensated signal.

Further, a driver DC voltage detecting circuit 227 detects the voltage of the motor driver circuit 200 based on the voltage at both ends of the capacitor 203. Then, ON/OFF of the regeneration resistance drive FET 211 is controlled so that the direct current voltage value detected by the driver DC voltage detecting circuit 227 becomes a predetermined value (135 volts, for example) or smaller.

Next, the operation of the first embodiment of the present invention will be explained.

Figure 2:
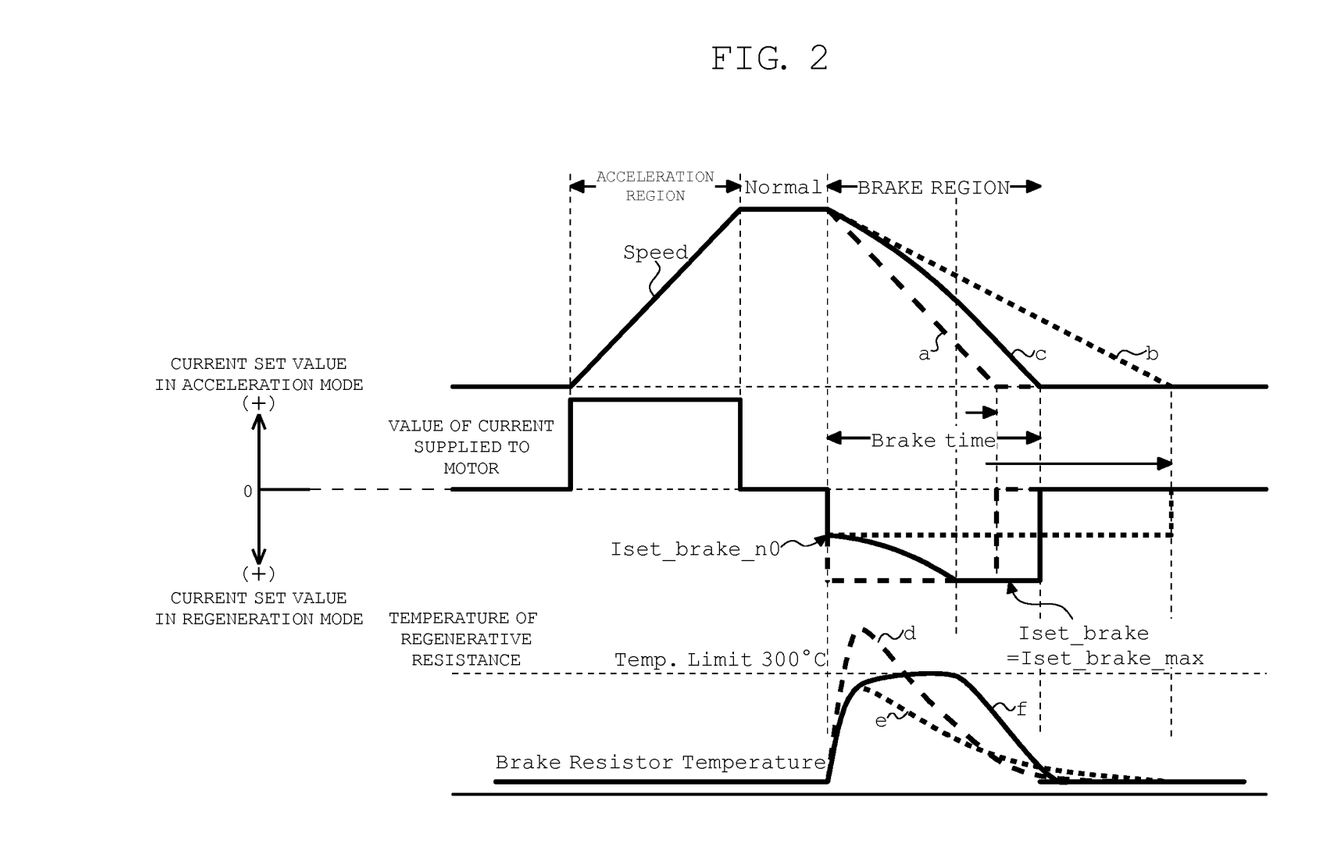
FIG. 2 is a diagram showing the relationship among the value of current supplied to a motor, motor speed, and stop time while showing the relationship between the value of current supplied to the motor and the temperature of a regenerative resistance.

FIG. 2 is a schematic diagram showing the relationship among the value of current supplied to a motor, motor speed, and stop time while showing the relationship between the value of current supplied to the motor and the temperature of a regenerative resistance. In the motor acceleration region on the left side of FIG. 2, the motor speed increases almost linearly by setting the value of current supplied to the motor at a predetermined value. Once the motor enters rated operation, the load applied to the pump due to evacuation becomes small and thus the current value to be required is very small.

After that, the motor enters a brake region (on the right side of FIG. 2.) If regenerative current having a maximum brake current value $I_{set\_brake\_max}$ (about 15 [A], for example) is continuously passed in this brake region, the motor speed can be reduced ideally and quickly as shown by the speed characteristic "a" of FIG. 2. On the other hand, however, regeneration energy consumed by the regenerative resistance 207 suddenly increases, and thus the temperature of the regenerative resistance 207 becomes far beyond a limit temperature (300 degrees, for example) in a short time as shown by the temperature characteristic "d" of the regenerative resistance in FIG. 2.

Further, if regenerative current having a current value $I_{set\_brake\_n0}$ (about 6 [A], for example) is continuously passed after the motor enters the brake region, regeneration energy consumed by the regenerative resistance 207 gradually increases. Accordingly, regeneration can be performed within a limit temperature (300 degrees, for example) as shown by the temperature characteristic "e" of the regenerative resistance in FIG. 2, while a long time is required until the motor speed is reduced as shown by the speed characteristic "b."

In order to avoid such a problem, in the present embodiment, the regenerative current is controlled so that the speed characteristic gradually approaches the inclination "a" from the inclination "b" depending on the motor speed in the initial stage of regeneration. In addition, a limit is set not to pass further current when the regenerative current reaches the maximum brake current value $I_{set\_brake\_max}$.

Specifically, in the brake region on the right side of FIG. 2, current is regenerated with the current flowing through each phase in the direction reverse to that when accelerating the motor. The regeneration energy when braking the motor is adjusted by reducing the brake current set value $I_{set_{13}brake}$ depending on the motor speed, as shown in Formula 1.

$$I_{set\_brake} = I_{set\_brake\_n0} \times \frac{n_0}{n} \qquad [\text{Formula 1}]$$

Here, $I_{set\_brake\_n0}$ represents an initial brake current value, $n_0$ represents maximum rated rotational speed, and n represents rotational speed.

The initial brake current value $I_{set\_brake\_n0}$ is set as a brake current set value $I_{set_{13}brake}$ when the motor enters the brake region, as shown in FIG. 2. After that, the current value gradually becomes larger as the motor speed is decelerated based on Formula 1, and a limit is set not to further increase the current value when the current value reaches the maximum brake current value $I_{set\_brake\_max}$. As stated above, when the motor is braked, control is performed so that the initial brake current value at the maximum rated speed is set low and the brake current is increased as the rotational speed decelerates.

Specifically, energy consumed by the regenerative resistance is made small when the motor rotates at high speed, and the energy consumption is increased as the motor speed decelerates.

Now explanation will be made based on the block diagram of FIG. 1. When the motor enters the brake region, the microprocessor 221 calculates and outputs, based on Formula 1, the set value level of motor current to be regenerated depending on the reducing rotation number detected by the rotational speed sensor 223. The three-phase bridge control circuit 225 compares this motor current set value with the current value detected by the motor current detecting circuit 205, and performs ON/OFF control on the gate of the three-phase bridge circuit 210 so that the deviation becomes 0. As stated above, the microprocessor 221 controls the three-phase bridge circuit 210 through current feedback and turns ON/OFF the regeneration resistance drive FET 211 so that the direct current voltage value detected by the driver DC voltage detecting circuit 227 becomes 135 volts or smaller, for example. In this way, the energy of the regenerative resistance is adjusted depending on the motor speed. Therefore, the motor speed can be decelerated in a short time within a maximum range of the allowable temperature for the regenerative resistance 207.

Figure 3:
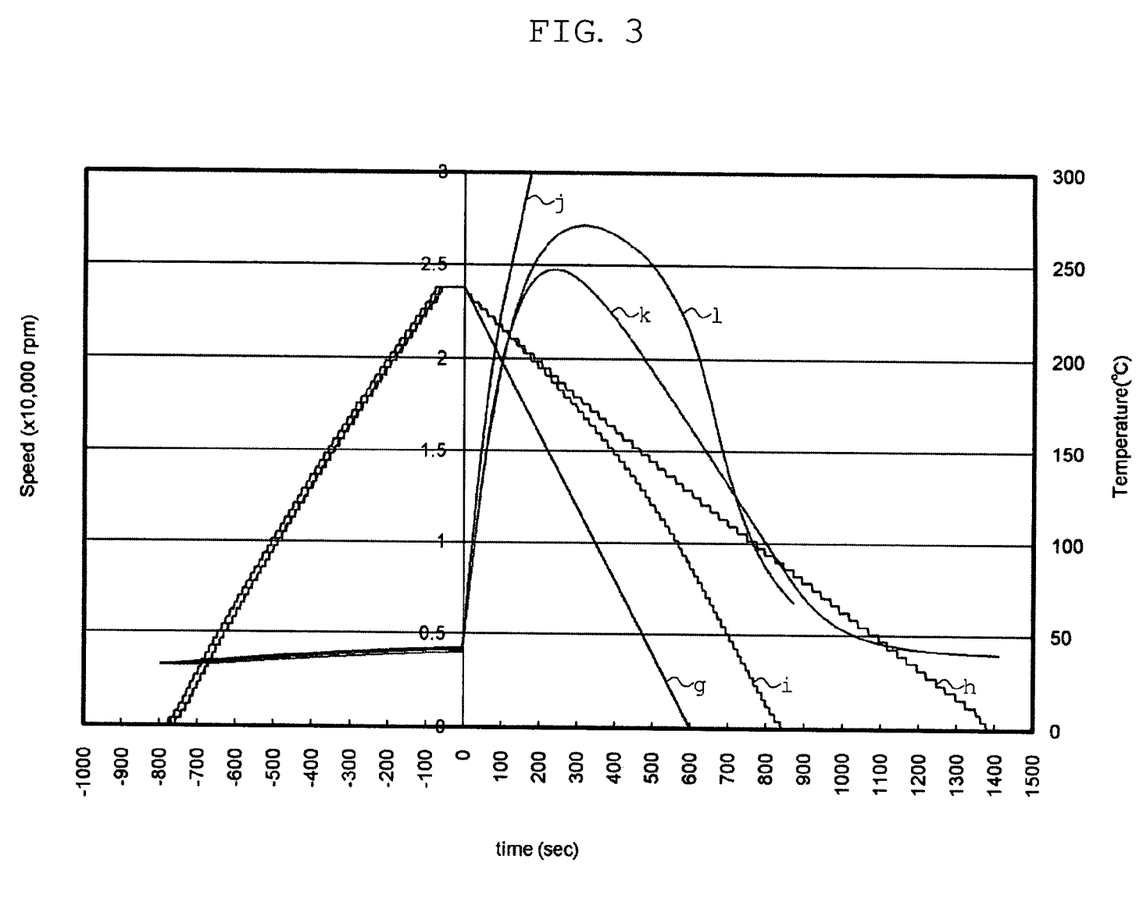
FIG. 3 is a diagram showing the relationship among the motor current value, motor speed, stop time, and temperature of the regenerative resistance.

FIG. 3 shows results obtained by actually performing an experiment based on the above model. In FIG. 3, line "g" shows a characteristic relationship between motor speed and stop time when the motor current set value is set constantly at 15 [A], and line "h" shows a characteristic relationship between motor speed and stop time when the motor current set value is set constantly at 6 [A]. Further, curve "i" shows a characteristic relationship between motor speed and stop time when the motor current set value is set depending on the motor speed, based on Formula 1.

When the motor current set value is set constantly at 15 [A] as shown by the line "g," the temperature of the regenerative resistance 207 suddenly rises as the stop time progresses as shown by the line "j" in the drawing, and thus exceeds the allowable temperature for the regenerative resistance 207 in a short time. On the other hand, when the motor current set value is set constantly at 6 [A] as shown by the line "h," the temperature of the regenerative resistance 207 gradually increases as the stop time progresses as shown by the line "k" in the drawing, and thus does not exceed 250 degrees even when the temperature is a maximum temperature. However, in this case, 1400 seconds are required to stop the motor. When the brake current set value $I_{set\_brake}$ is set based on Formula 1 as shown by the line "i" in the drawing, the temperature of the regenerative resistance 207 is about 280 degrees even when the temperature is nearly a maximum temperature, and the stop time can be reduced to about 800 seconds within a maximum range of the allowable temperature for the regenerative resistance 207.

Accordingly, heat generated by a regenerative resistance can be restrained within a specific temperature range without employing a regenerative resistance having a greater capacity, a heat sink, or a FAN generating a larger volume of air. Further, it is possible to realize a compact and low-cost motor driver circuit capable of achieving an appropriate brake time.

Figure 4:
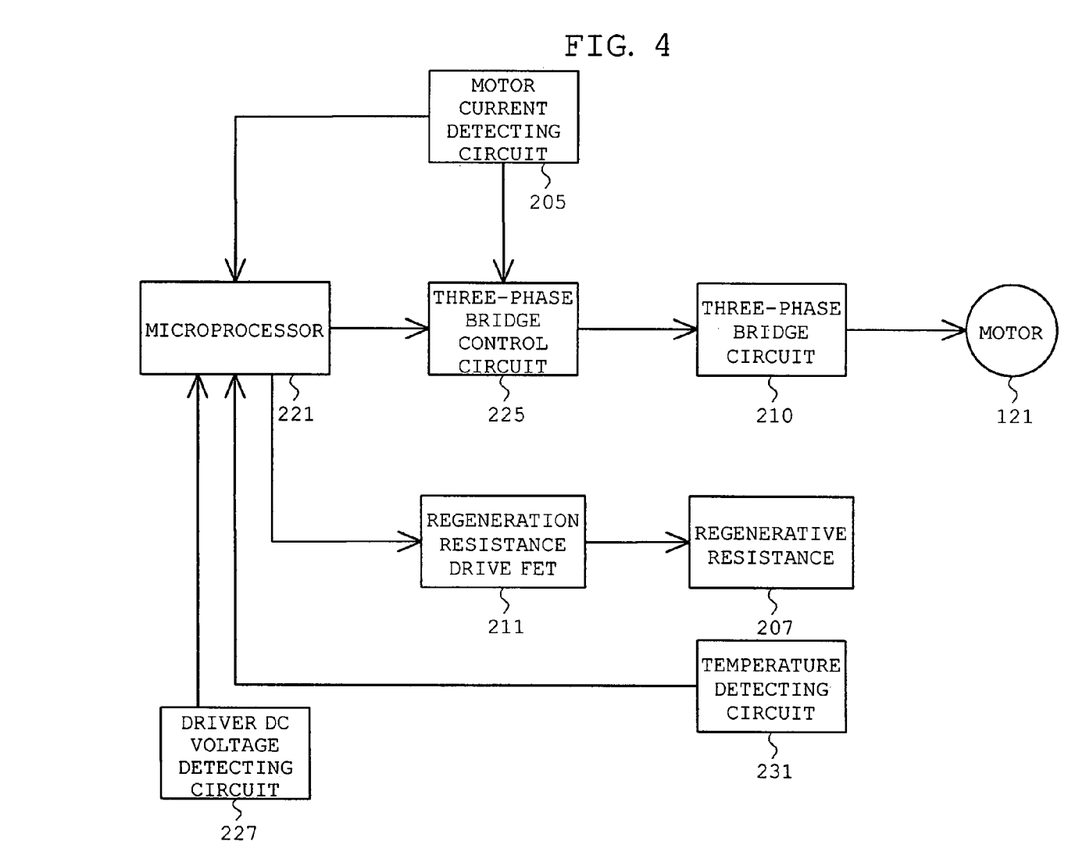
FIG. 4 is a block diagram of a second embodiment of the present invention.

Next, a second embodiment of the present invention will be explained. FIG. 4 is a block diagram of the second embodiment of the present invention. Note that the same components as those in FIG. 1 are given the same symbols, and the explanation thereof will be omitted.

In FIG. 4, a temperature detecting circuit 231 detects the temperature of the regenerative resistance 207 and outputs the information to the microprocessor 221. The microprocessor 221 sets a current command value so that this temperature becomes a predetermined value or smaller. The three-phase bridge control circuit 225 performs HD compensation calculation etc. so that the motor current detected by the motor current detecting circuit 205 becomes this current command value, and PWM control is performed on each FET of the three-phase bridge circuit 210 based on this compensated signal.

Next, the operation in the second embodiment of the present invention will be explained based on the flowchart of FIG. 5.

Figure 5:
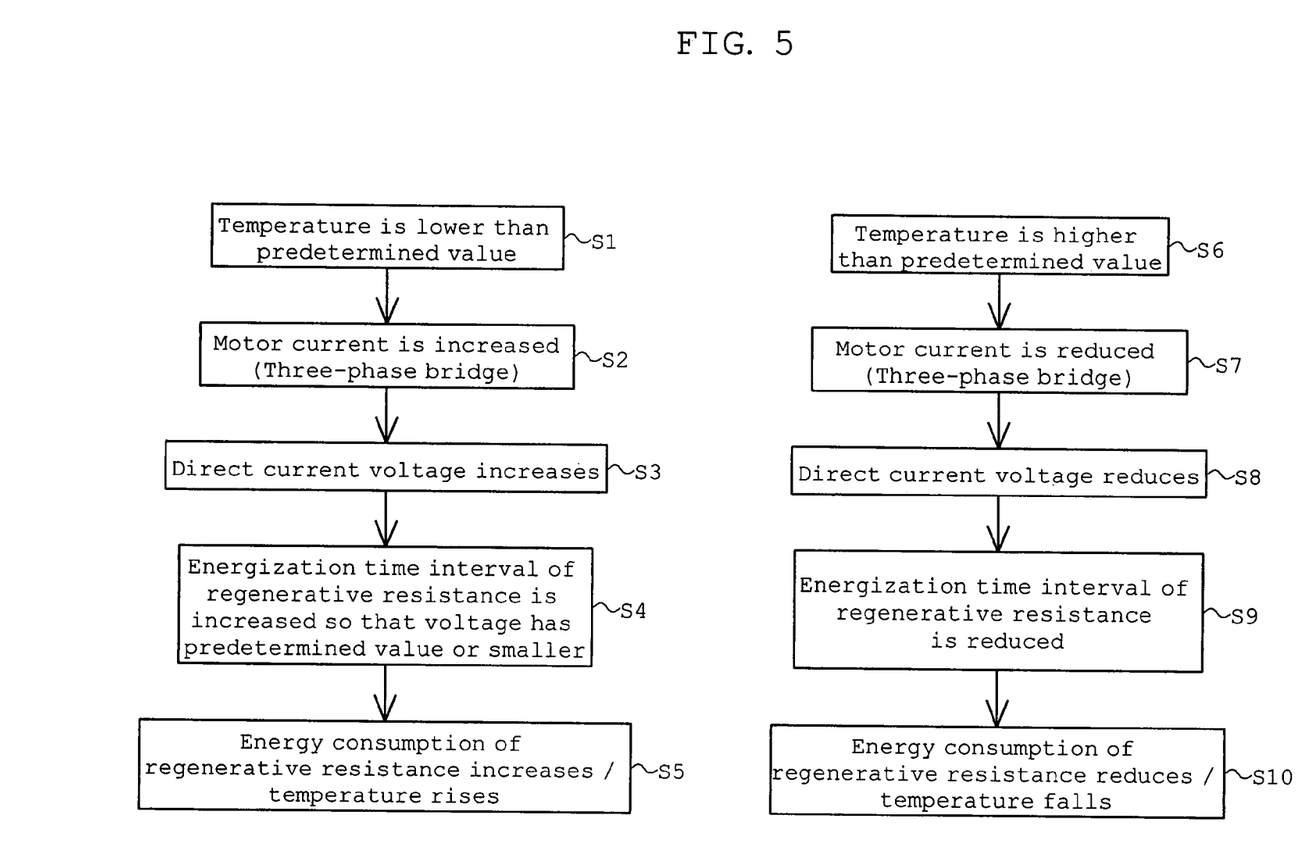
FIG. 5 is a flowchart showing the operation in the second embodiment the present invention.

In FIG. 5, at step 1 (abbreviated as S1 in the drawing. The same can be applied to the other steps), the microprocessor 221 judges whether the temperature of the regenerative resistance 207 detected by the temperature detecting circuit 231 is higher or lower than a predetermined value. When the temperature is low, the current command value to the three-phase bridge control circuit 225 is increased at step 2. Based on this current command value, the three-phase bridge control circuit 225 transmits an ON/OFF signal to each FET of the three-phase bridge circuit 210. As a result, the voltage of the motor driver circuit 200 increases at step 3. Thus, at step 4, the microprocessor 221 increases the time interval to supply current to the regenerative resistance 207 so that the voltage becomes a predetermined value or smaller. Accordingly, at step 5, energy consumed by the regenerative resistance 207 increases and the temperature of the regenerative resistance 207 becomes higher.

On the other hand, when the temperature of the regenerative resistance 207 detected by the temperature detecting circuit 231 is higher than a predetermined value as in step 6, the current command value to the three-phase bridge control circuit 225 is reduced at step 7. As a result, the voltage of the motor driver circuit 200 reduces at step 8. Thus, at step 9, the microprocessor 221 reduces the time interval to supply current to the regenerative resistance 207. Accordingly, at step 10, energy consumed by the regenerative resistance 207 reduces and the temperature of the regenerative resistance 207 becomes lower.

In this way, a similar effect to the first embodiment can be achieved.

Figure 6:
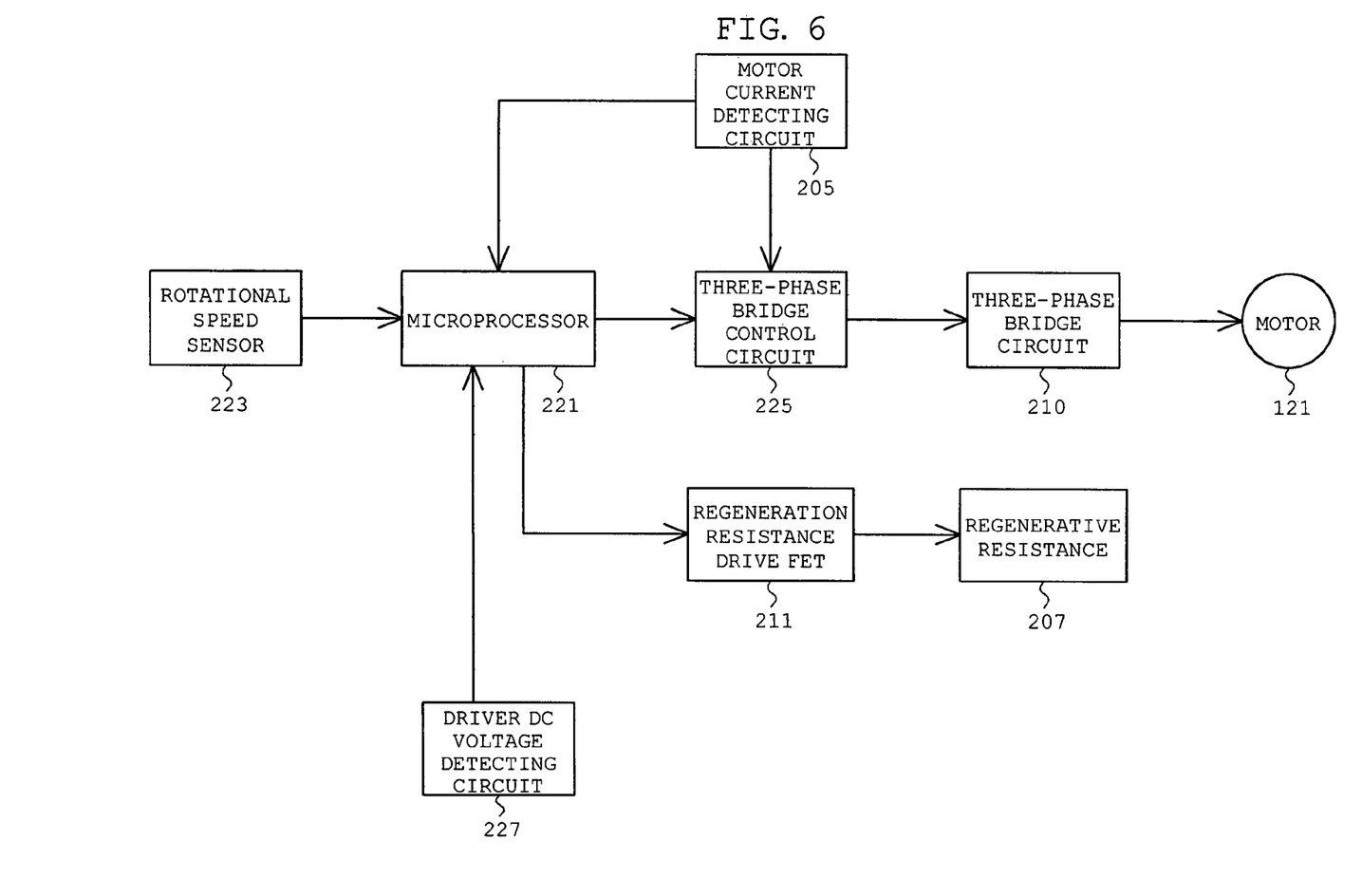
FIG. 6 is a block diagram of a third embodiment of the present invention.

Next, a third embodiment of the present invention will be explained. FIG. 6 is a block diagram of the third embodiment of the present invention. Note that the same components as those in FIG. 1 are given the same symbols, and the explanation thereof will be omitted.

In FIG. 6, the microprocessor 221 stores a preset lookup table in a storage area (not shown). This lookup table determines the ON/OFF duty cycle of the regeneration resistance drive FET 211 with respect to the motor speed. The microprocessor 221 refers the lookup table depending on the motor speed detected by the rotational speed sensor 223, extracts an applicable ON/OFF duty cycle, and drives the gate signal of the regeneration resistance drive FET 211 based on this ON/OFF duty cycle.

Further, the microprocessor 221 obtains a current command value so that the direct current voltage value detected by the driver DC voltage detecting circuit 227 becomes a predetermined value (135 volts, for example) or smaller. The three-phase bridge control circuit 225 performs PID compensation calculation etc. so that the motor current detected by the motor current detecting circuit 205 becomes this current command value, and PWM control is performed on each FET of the three-phase bridge circuit 210 based on this compensated signal.

Next, the operation in the third embodiment of the present invention will be explained.

When setting the lookup table, it is necessary to perform an experiment etc. to previously evaluate and determine a drive pattern which makes it possible that the regenerative resistance 207 optimally consumes energy at a temperature within a specific range.

As an example of the pattern image to supply current to the regenerative resistance 207, energization time for the gate signal of the regeneration resistance drive FET 211 is shortened when the motor speed is high, while the energization time is lengthened when the motor speed is low, as in the first embodiment, for example. Note that when the direct current voltage detected by the driver DC voltage detecting circuit 227 becomes a predetermined value (125V, for example) or smaller, drive of the gate signal of the regeneration resistance drive FET 211 is turned OFF.

Further, the microprocessor 221 obtains a current command value so that the direct current voltage value detected by the driver DC voltage detecting circuit 227 becomes a predetermined value (135 volts, for example) or smaller. The three-phase bridge control circuit 225 performs PID compensation calculation etc. so that the motor current detected by the motor current detecting circuit 205 becomes this current command value, and PWM control is performed on each FET of the three-phase bridge circuit 210 based on this compensated signal.

In this way, a similar effect to the first embodiment can be achieved.

Figure 7:
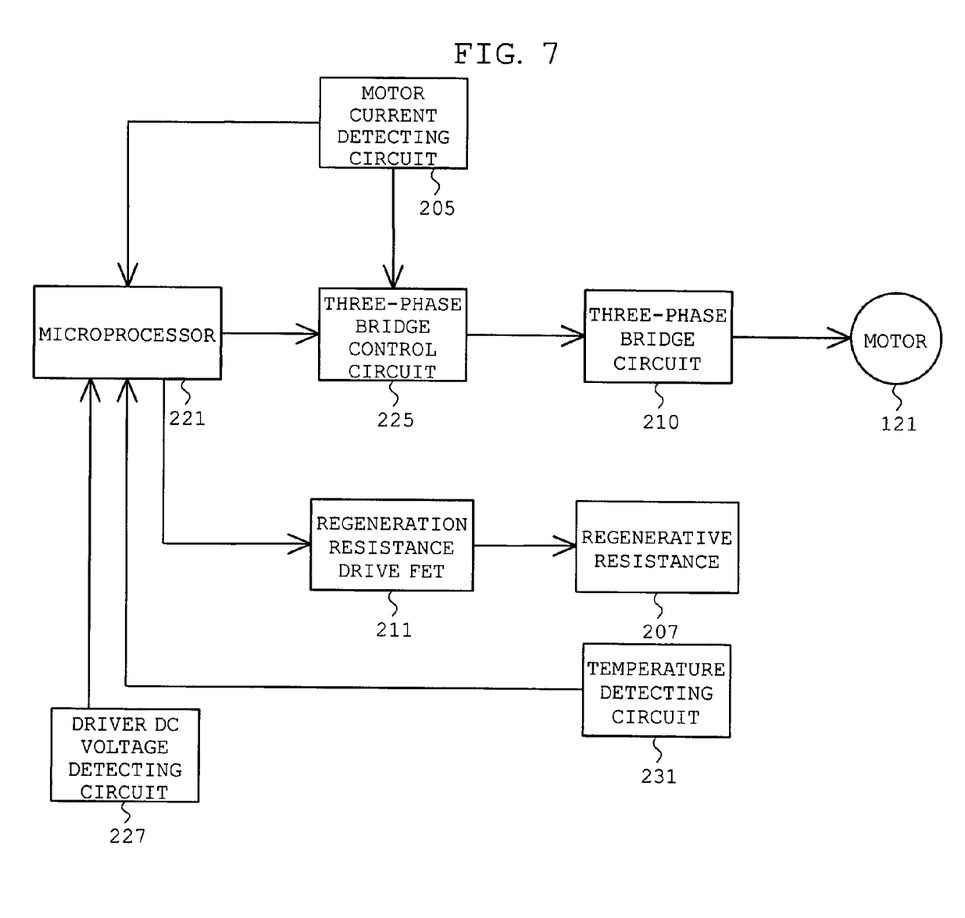
FIG. 7 is a block diagram of a fourth embodiment of the present invention.

Next, a fourth embodiment of the present invention will be explained. FIG. 7 is a block diagram of the fourth embodiment of the present invention. Note that the same components as those in FIG. 4 are given the same symbols, and the explanation thereof will be omitted.

In FIG. 7, the microprocessor 221 drives the gate signal of the regeneration resistance drive FET 211 so that the temperature detected by the temperature detecting circuit 231 becomes a predetermined value or smaller.

Further, the microprocessor 221 obtains a current command value so that the direct current voltage value detected by the driver DC voltage detecting circuit 227 becomes a predetermined value (135 volts, for example) or smaller. The three-phase bridge control circuit 225 performs PID compensation calculation etc. so that the motor current detected by the motor current detecting circuit 205 becomes this current command value, and PWM control is performed on each FET of the three-phase bridge circuit 210 based on this compensated signal.

Next, the operation in the fourth embodiment of the present invention will be explained.

Concretely, the microprocessor 221 shortens the time interval to supply current to the regenerative resistance 207 when the detected temperature is high, and lengthens the time interval to supply current to the regenerative resistance 207 when the detected temperature is low. Note that when the direct current voltage detected by the driver DC voltage detecting circuit 227 becomes a predetermined value (125V, for example) or smaller, drive of the gate signal of the regeneration resistance drive FET 211 is turned OFF.

In this way, a similar effect to the first embodiment can be achieved.

121: Motor
200: Motor driver circuit
205: Motor current detecting circuit
207: Regenerative resistance
210: Three-phase bridge circuit
211: Regeneration resistance drive FET
221: Microprocessor
223: Rotational speed sensor
225: Three-phase bridge control circuit
227: Driver DC voltage detecting circuit
231: Temperature detecting circuit

The invention claimed is:

1. A magnetic bearing device comprising:
   a magnetic bearing unit configured to levitate and support a rotor shaft;
   a motor configured to rotate the rotor shaft;
   a motor drive circuit configured to drive the motor;
   a motor speed detector configured to detect motor speed of the motor;
   a current detector configured to detect current flowing through the motor drive circuit;
   a regenerative resistance configured to let regenerated current flowing from the motor drive circuit pass therethrough when the motor is braked;
   a motor driving current set value calculating unit configured to calculate a driving current set value of the motor depending on the motor speed detected by the motor speed detector so that energy consumption of the regenerative resistance becomes small when the motor rotates at high speed and increases as the motor speed decelerates to prevent temperature of the regenerative resistance from exceeding an allowable temperature when the motor is braked;
   a driving current adjuster configured to adjust a driving current so that the current detected by the current detector becomes the driving current set value calculated by the motor driving current set value calculating unit;
   a control element configured to control whether or not to pass current, the control element being connected in series with the regenerative resistance;
   a capacitor having one end connected to one end of the regenerative resistance, and the other end connected to the other end of the regenerative resistance through the control element;
   a voltage detector configured to detect voltage of the motor drive circuit; and
   a control element driving unit configured to drive the control element ON/OFF so that the voltage detected by the voltage detector becomes a set voltage value or smaller, wherein the driving current set value calculated by the motor driving current set value calculating unit is set at a driving current value $I_{set\_brake\_n0}$ when the motor operates at a maximum rated speed so that the magnitude of the driving current value $I_{set\_brake\_n0}$ is initially smaller than a maximum current value $I_{set\_brake\_max}$ and the magnitude of the driving current value becomes larger as the motor speed decelerates, and wherein the motor drive circuit drives the motor based on the driving current adjusted by the driving current adjuster.

2. The magnetic bearing device of claim 1, wherein a limit $I_{set\_brake\_max}$ is set so that the driving current set value does not become a predetermined value or greater.

3. A vacuum pump that includes the magnetic bearing device of claim 1.

4. A motor driver circuit comprising:
   a motor;
   a motor drive circuit configured to drive the motor;
   a regenerative resistance configured to let regenerated current flowing from the motor drive circuit pass therethrough when the motor is braked, the regenerative resistance being arranged in parallel with a power source;
   a control element configured to control whether or not to pass current, the control element being connected in series with the regenerative resistance;
   a motor speed detector configured to detect motor speed of the motor;
   a current detector configured to detect current flowing through the motor drive circuit;

a table configured to determine a relationship between the motor speed and a duty cycle of an ON/OFF signal for driving the control element;

a duty cycle calculating unit configured to calculate, based on the table, the duty cycle of the ON/OFF signal for driving the control element depending on the motor speed detected by the motor speed detector when the motor is braked;

a control element controller configured to control ON/OFF of the control element based on the duty cycle calculated by the duty cycle calculating unit;

a capacitor having one end connected to one end of the regenerative resistance, and the other end connected to the other end of the regenerative resistance through the control element;

a voltage detector configured to detect voltage of the motor drive circuit; and a driving current adjuster configured to adjust driving current so that the voltage detected by the voltage detector becomes a set voltage value or smaller, wherein the motor drive circuit drives the motor based on the driving current adjusted by the driving current adjuster.

5. A vacuum pump that includes the motor driver circuit of claim 4.

* * * * *